3,589,997
METHOD FOR PURIFYING WASTE WATER
James F. Grutsch, Hammond, and Russell C. Mallatt, Crown Point, Ind., assignors to Standard Oil Company, Chicago, Ill.
Filed May 15, 1969, Ser. No. 824,858
Int. Cl. C02c 5/10
U.S. Cl. 210—13                                                    2 Claims

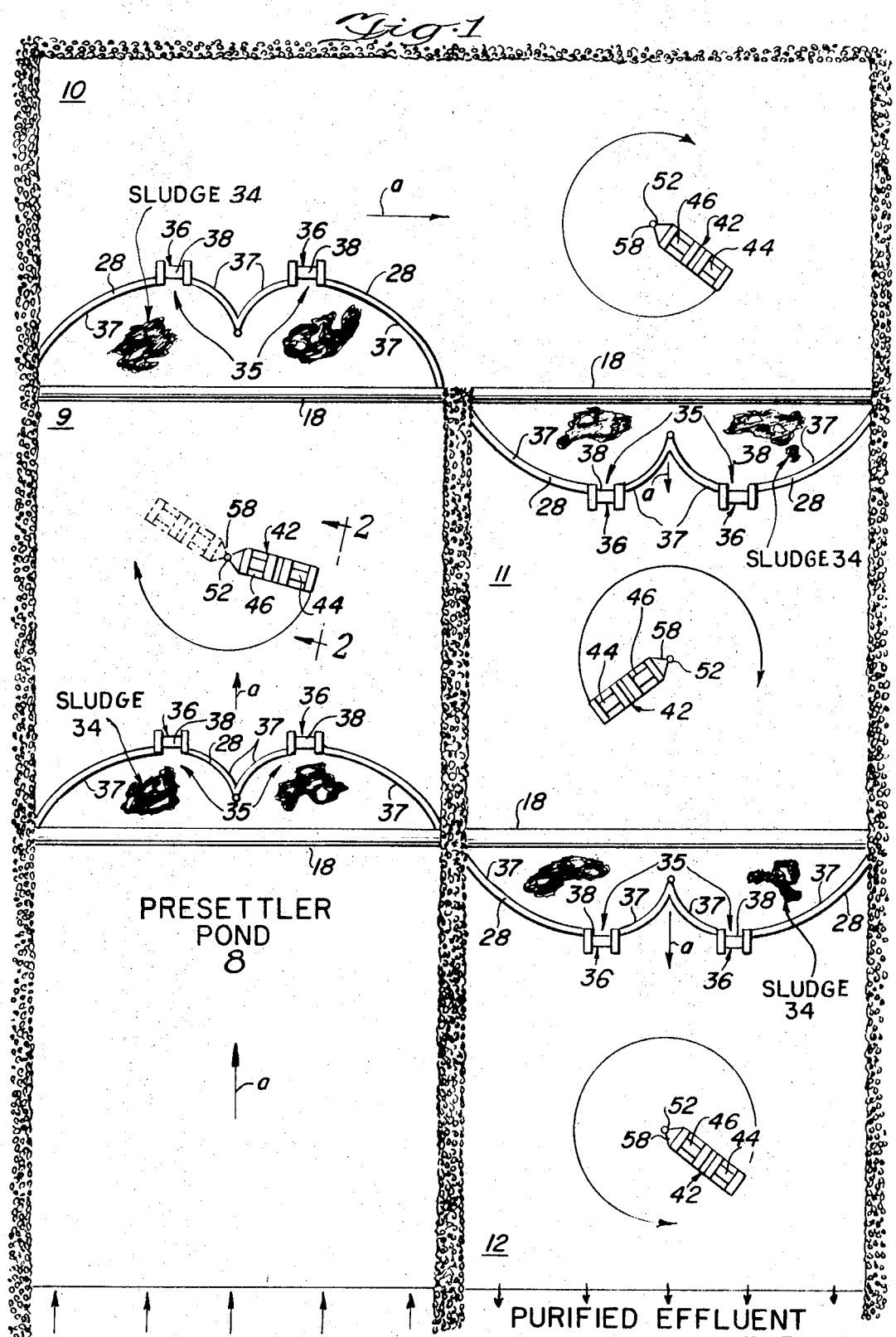

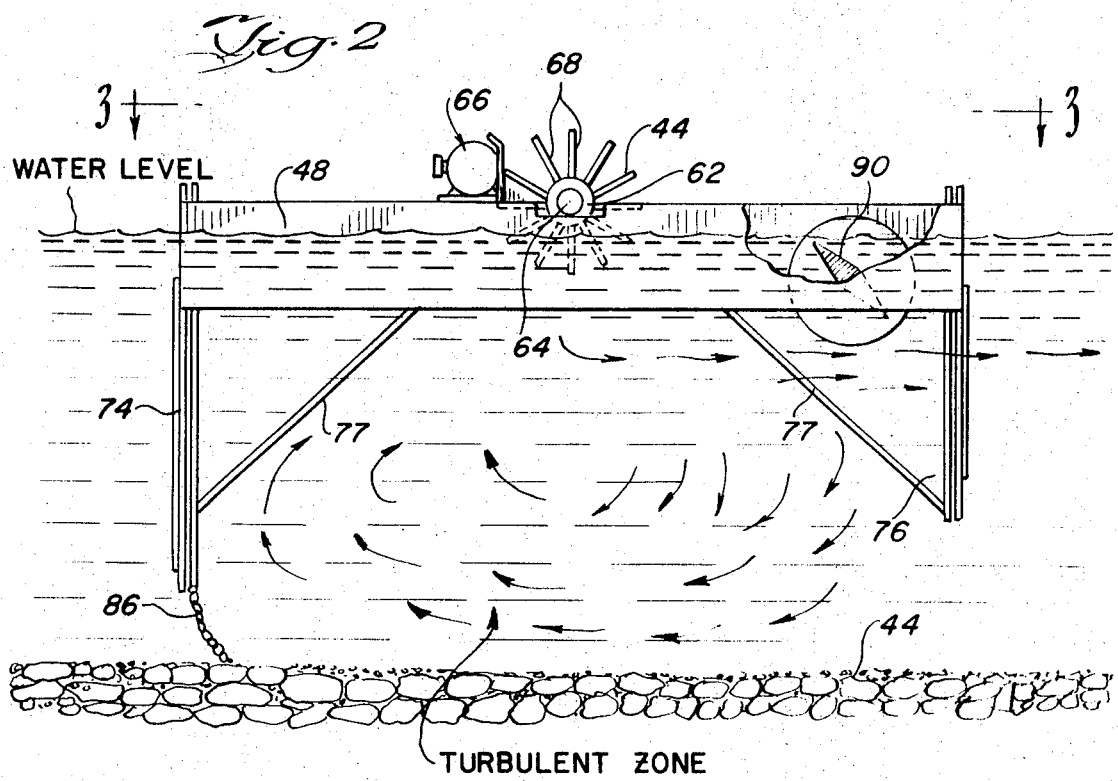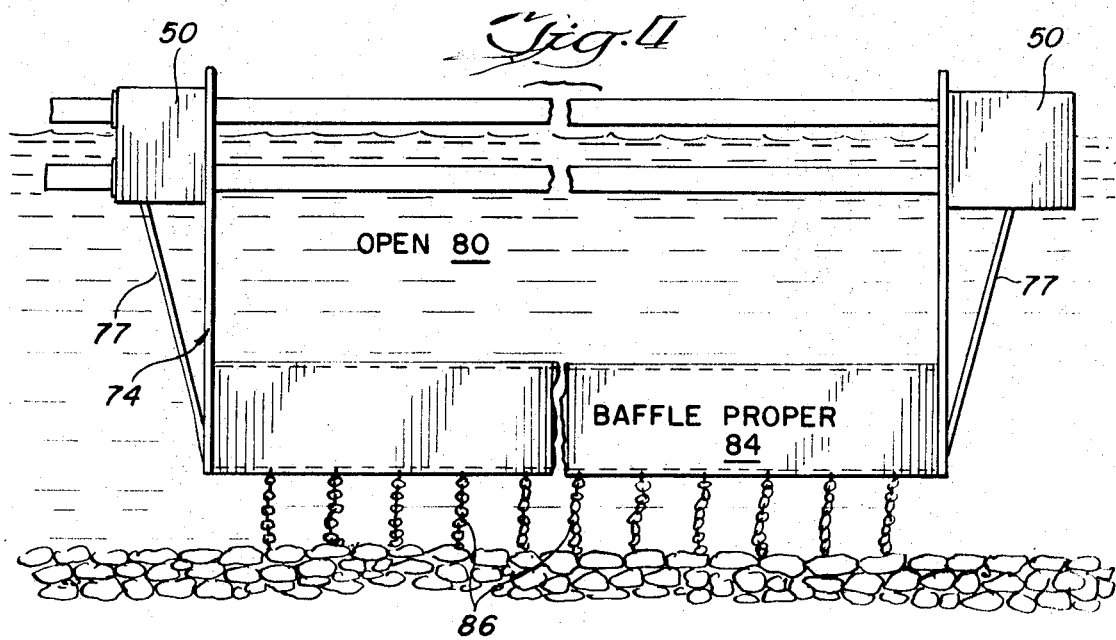

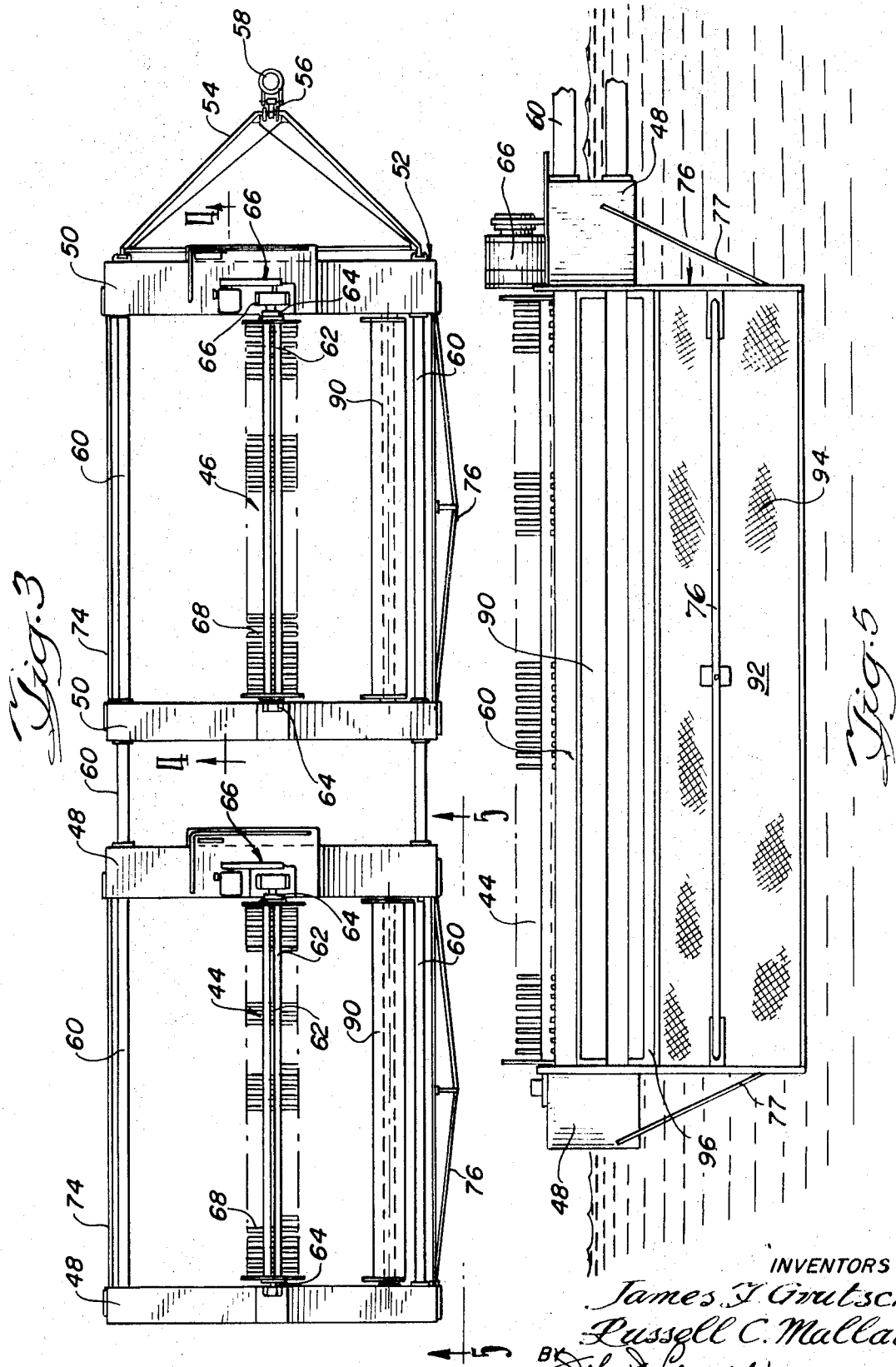

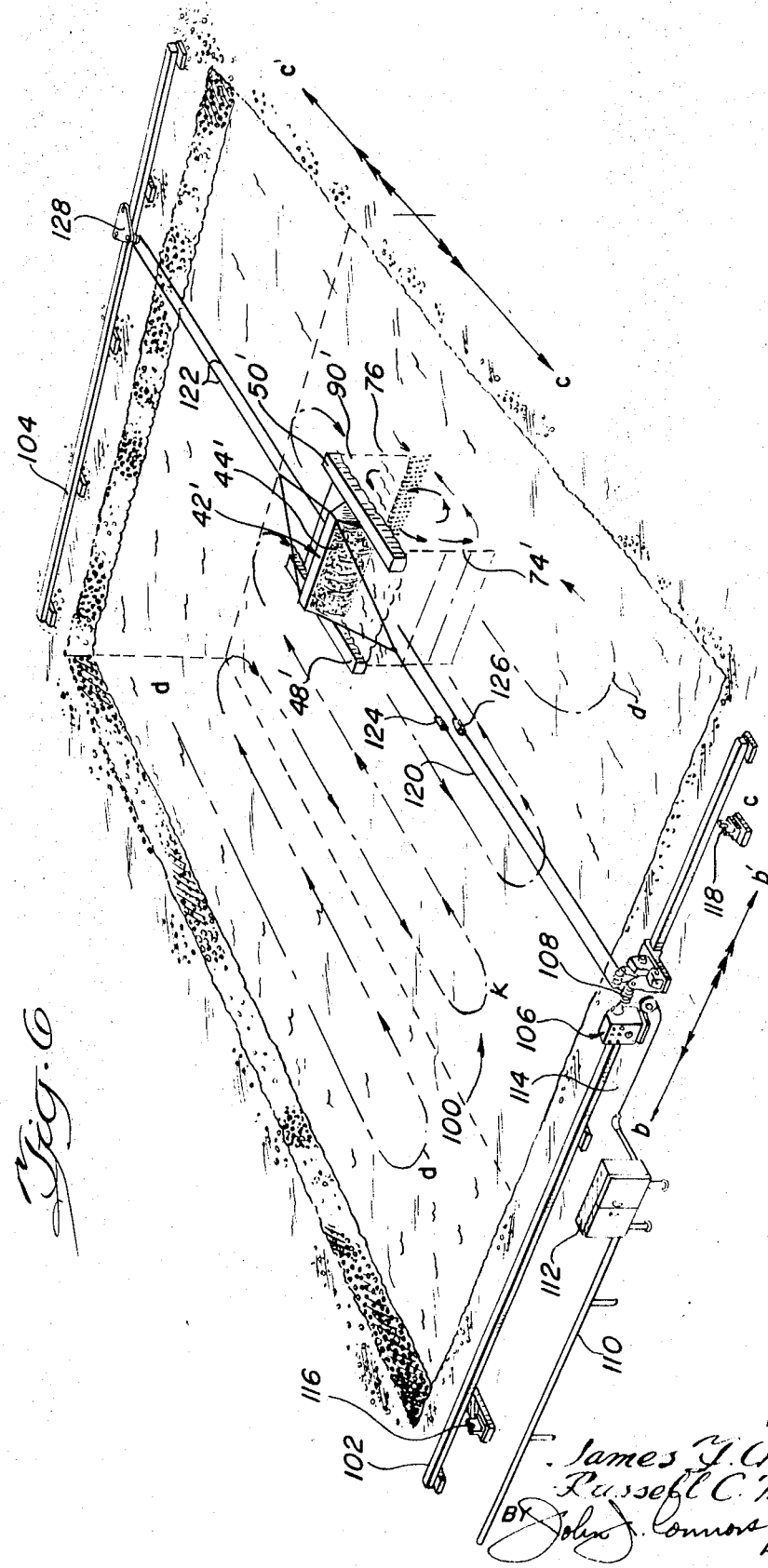

ABSTRACT OF THE DISCLOSURE

In this system, waste water, particularly refinery waste water, is treated in a series of lagoons in which thrive microorganisms that feed on contaminants in the waste water. The system is characterized by mobile aerator apparatus moving across the lagoons' surfaces. These apparatus introduce air into the lagoons and churn surface water, and they have means which direct at least some of the churning surface water towards the lagoons' bottoms. The underwater turbulence scours the lagoons' bottoms and provides a way of controlling sludge deposits.

BACKGROUND OF THE INVENTION

The need to reduce water pollution is well known. Contaminated waste water must be purified to a high degree before it is discharged into rivers and lakes. Present purification processes rely, at least in part, on aquatic microorganisms to cleanse waste water of organic and inorganic pollutants. These organisms breathe oxygen, assimilate pollutants, grow, reproduce, and die. As this life cycle proceeds, a biologically active sludge forms which occludes pollutants. This sludge may be buoyant, but more often it is heavy and sinks.

Aquatic microorganisms demand oxygen, and there are several ways of satisfying this demand. When large areas of land are available, large quantities of water are usually allowed to stand for several months in a shallow basin. The water in such a basin may have a surface area covering several thousand acres, and the natural transfer of oxygen from the atmosphere to this surface supplies all the oxygen needed for purification. But where land is scarce, the same quantities of waste water often are purified by retention for a few days in a relatively deep lagoon having a small surface area of only a few acres. To supply the required oxygen, air is physically beaten into the lagoon's surface. One such water purification process, which we call the bioflotation process, is illustrated in U.S. Pat. No. 2,948,677.

If a high concentration of gaseous oxygen is dissolved in the lagoon, aerobic organisms evolve. If the lagoon lacks gaseous oxygen, the organisms extract the oxygen combined in the chemical structure of the pollutant. In the latter case, anaerobic organisms evolve. Anaerobic organisms however produce, among other things, malodorous hydrogen sulfide and other partial decomposition products which impart an objectionable taste and odor to the water. Thus, the growth of anaerobic organisms usually should be suppressed, and this can be achieved by supplying enough gaseous oxygen to meet the demands of the aerobic population. However, sometimes it is desirable to promote anaerobic growth, for example to remove nitrate.

Increasing the concentration of organisms in a purification system, consistent with the oxygen availability increases the system's capacity for purification. The more organisms, the more contaminants removed. In the well-known activated sludge process, organisms and contaminated water are mixed in a reactor and then some of the mix is withdrawn to a clarifier. In the clarifier, the biologically active sludge separates from purified water. Some of this sludge is recycled to the reactor to increase or maintain the concentration of organisms in the reactor, and excess sludge is dewatered, stabilized and disposed of by various means. Air under pressure is bubbled through the mix in the reactor, and the bubbling air disperses the sludge. The chief disadvantages of the activated sludge process are that it requires a large capital investment and is expensive to operate and maintain. By contrast, the bioflotation process requires a relatively small capital investment and is inexpensive to operate and maintain. The bioflotation process however suffers from one disadvantage that is common to all aerated lagoon systems. Namely, after a while, a great deal of sludge settles to the lagoon's bottom. Because the lower strata of the lagoon contain little dissolved oxygen, anaerobic organisms flourish in this sludge, contributing taste and odor impurities to the water. The accumulation of this stagnant sludge normally is allowed to continue until it becomes intolerable. Then it must be removed. At the American Oil Company's bioflotation lagoon at Whiting, Indiana, the cost of removing sludge from the lagoon and hauling it away has amounted to $200,000 for a single cleaning. Our invention both controls sludge build-up on the lagoon's bottom, and introduces air into the lower strata of a lagoon to suppress the growth of anaerobic organisms.

Our invention is also concerned with developing and concentrating specialized organisms in the lagoons. Like humans, aquatic microorganisms often prefer different foods. Some waste water contains pollutants, for example glucose or starch, which the organisms assimilate very readily. Other waste water, such as waste waters from an oil refinery, contains pollutants, for example phenolics, which the organisms find unappetizing or even toxic. Because these organisms do not readily consume many of the pollutants in refinery waste water, it often takes longer to purify refinery waste water than it does to purify waste water from other sources. Consequently, it would be desirable to create conditions which favor the growth of organisms which like the more refractory pollutants found in refinery waste water. Our invention, surprisingly, does accomplish this development of such a specialized species of organisms, and provides a way to concentrate this species in a lagoon.

DESCRIPTION OF THE INVENTION

System

Our invention, in its broadest aspect, is a system for purifying contaminated waste water, particularly waste water from oil refineries. This system includes a plurality of lagoons in which thrive aquatic microorganisms. As waste water flows through these lagoons sequentially apparatus of our invention moves across the lagoons' surfaces introducing air into the surface water, and churning this surface water. The apparatus are equipped with means which direct at least some of the churning water towards the lagoons' bottoms. This aerates the lower strata of the lagoons, keeps sludge stirred up, and provides for control of sludge build-up on the lagoons' bottoms. We have found that establishing underwater currents which have a velocity of about 0.5 foot per second or greater is sufficient to maintain sludge in suspension.

Method

We have also invented a method which provides improved removal of refractory compounds from the waste water. The method involves passing the contaminated waste water through a series of lagoons in which thrive microorganisms that feed on the contaminants in the waste water and produce a sludge. Most of the lagoons' strata are aerated to promote the growth of aerobic microorganisms and to suppress the growth of anaerobic microorganisms. The general character of the microorganism population in each lagoon differs according to the food supply prevailing. Thus, in the initial lagoons the prevailing microorganisms mainly feed on the easy to assimilate contaminants having a high rate of biochemical oxidation. In the downstream lagoons, where the remaining food material is of a more refractory nature, such as phenolics, a microorganism population having a capacity to assimilate these refractory materials can be made to accumulate by means of our invention. Usually this microorganism population utilizing refractory compounds as a food supply has a comparatively slow biochemical oxidation rate. To accomplish removal of these refractory compounds in a reasonable time period, it is necessary to have a high concentration of microorganisms. To create in downstream lagoons an environment conducive to the evolution and concentration of such specialized microorganisms having a capacity to assimilate refractory compounds, we stir downstream lagoons less vigorously than upstream lagoons, so that the microorganisms settle and accumulate in larger concentration due to the more quiescent conditions in the lagoon. Our system is unique in its capability to accumulate a microorganism population in a lagoon over a wide range of concentrations simply by varying the fraction of stirring confined to the baffled zone of our apparatus which shall be discussed below. The more stirring supplied to the lagoon proper the more dispersed, and thus lower concentration, the microorganism population; the less stirring supplied to the lagoon proper the more quiescent conditions will facilitate settling and accumulation of microorganisms. Thus, by means of our process a highly efficient, non-homogeneous microorganism population can be utilized for water purification compared to the homogeneous microorganism populations utilized by the activated sludge process.

The lagoons preferably have a depth in excess of 3 feet. Since the lower strata of these deep lagoons are aerated, aerobic growth is promoted and anaerobic growth is suppressed. Because of aeration, a great deal of sludge in the lagoon is rendered buoyant. This floating sludge is skimmed off the lagoon's surface and sent to an incinerator or is otherwise disposed of. Our method is particularly adapted to purify waste water containing a high level of phenolic compounds. We can forecast that the phenolic concentration of most refinery waste waters can be reduced to a level below 0.05 p.p.m. Surprisingly, by passing waste water sequentially through a series of lagoons, and stirring water in downstream lagoons less vigorously than upstream lagoons, there results in downstream lagoons the evolution and concentration of a species of organisms which more actively consume refractory contaminants such as phenolic compounds.

Apparatus

Our apparatus, although designed for use with our system and method, is not limited solely to such use. This apparatus comprises: (i) aerator means adapted to move across the lagoon's surface, and (ii) baffle means coupled to the aerator means and extending below the lagoon's surface. The aerator means introduce air into the lagoon's surface water, churn the surface water, and move the surface water in a generally horizontal direction. The baffle means direct at least some of the moving surface water towards the lagoon's bottom. As the apparatus moves across the lagoon, it lifts bottom sludge, recontacts the sludge with organic pollutants in the water, aerates the mixture, and ejects the mixture to the quiescent lagoon where the sludge biooxidizes the pollutants and settles until the next sweep of the apparatus.

The aerator means is preferably of the conventional rotary type, referred to commercially as brush aerators, cage rotors, mammoth rotors, etc. This type aerator has a shaft which may be rotatably mounted between a pair of spaced pontoons floating on the lagoon's surface. Flat blades bristle forth from the shaft, and drive means rotate the shaft, causing the blades to churn the surface of the water, transfer air into the water, impart a horizontal velocity vector to surface water, and move the apparatus over the surface of the lagoon. The apparatus may be connected to pivot means located at or near the center of the lagoon. When so connected, the pumping action of the blades propels the apparatus so that it moves over the lagoon along a circular course about the pivot means. The apparatus may also be connected to cables or guide rails. When so connected, the aerator is moved so that it laterally traverses over the lagoon. When the end of the guide means is reached, appropriate switch gear automatically reverses movement of the apparatus, and in this manner, the apparatus repeatedly retraces its path back and forth over the surface of the lagoon.

The baffle means can be of any suitable configuration adapted to direct high velocity, churning surface water towards the lagoon's bottom, and the baffle does not have to touch the lagoon's bottom. We prefer to use two baffle members which straddle the aerator so that, as the apparatus moves, one baffle member leads the rotating blades and the other baffle member follows the blades. This confines the churning water to a turbulent zone between the two baffle members. However, only one such member can be used.

Preferably the upper portion of the trailing baffle member is movable. The position of this movable portion will govern the amount of high velocity, churning water directed towards the bottom of the pond. Thus, by moving this portion to different positions, varying amounts of churning water impinge against the lagoon's bottom. The lower portion of this trailing member preferably has a plurality of perforations therein. These perforations enable the apparatus to move more readily through the water, and also serve as sites for biological growth. The upper portion of the leading baffle member has an expanded opening. This also facilitates movement of the apparatus through the water. The lower portion of this leading baffle member may be a solid plate, and attached to this plate may be means which drag along the bottom of the lagoon to lift or scrape off sludge, to facilitate pickup and redispersion of the sludge by the churning water.

Our apparatus has many variegated advantages. It reduces sludge accumulation on a lagoon's bottom. It aerates the lower stratas of a deep lagoon, keeping the composition of the microorganisms aerobic. It provides the capability of controlling the process conditions in the system, and when used in a series of lagoons according to our method, selectively concentrates in downstream lagoons microorganisms having an appetite for phenolics or other residual refractory contaminants.

The movable baffle portion is the means for controlling microorganism concentrations. When the movable baffle portion is set to direct the maximum amount of churning surface water towards the lagoon's bottom, quiescent settling conditions in the lagoon proper are maximized, the maximum amount of organisms settled throughout the lagoon, and thus the concentration of organisms in the lagoon is maximized. Consequently, the concentration of microorganisms in the effluent stream is at a minimum. In contrast, when the movable baffle portion is set to direct less churning water towards the lagoon's bottom, the lagoon proper will be less quiescent and more microorganisms will be suspended in the lagoon, and consequently, more microorganisms will be carried out with the effluent stream.

Another surprising advantage of our apparatus is the unexpected increase in aerator efficiency. We have found that equipping conventional, floating, rotary aerators with downwardly extending baffles increases the oxygen transfer capacity of the aerator by up to 10%. Thus, aerating and mixing capability per unit of expended horse power are substantially increased. Moreover our apparatus, which is relatively small and inexpensive, is able to service large lagoons because of its maneuverability.

DESCRIPTION OF DRAWINGS

FIG. 1 is a plan view of the waste water purification system of our invention schematically illustrating the apparatus of our invention.

FIG. 2 is an end elevational view taken along line 2—2 of FIG. 1.

FIG. 3 is a plan view taken along line 3—3 of FIG. 2.

FIG. 4 is a cross-sectional view taken along line 4—4 of FIG. 3.

FIG. 5 is a rear elevational view taken along line 5—5 of FIG. 3.

FIG. 6 is a perspective view schematically illustrating an alternate embodiment of our apparatus.

DESCRIPTION OF PREFERRED EMBODIMENTS

The water purification system shown in FIG. 1 includes a presettler pond 8 and a series of separate bioflotation lagoons 9–12. As indicated by arrows a, contaminated water flows from upstream lagoon 9, through lagoons 10 and 11, and thence into downstream lagoon 12. Bioflotation lagoons 9–12, which are described in detail in U.S. Pat. No. 2,948,677, each have a number of immobile rotary aerators 18 lined up in a row so that they stretch between opposite banks of lagoons 9–12. These aerators 18 beat air into the water, and the air promotes the growth of aerobic sludge 34 which occludes oil and solid contaminants and then floats to the lagoons' surfaces.

Floating barrier means or booms 28, connected to opposite banks of lagoons 9–12, extend across the lagoons transverse to the direction of water flow. These booms 28 confine floating sludge 34 to the upstream ends of each lagoon, and the flow of the water pushes sludge 34 towards skimmers 36 located along booms 28. Suitable skimmers can be obtained from the Rex Chainbelt Corporation of Milwaukee, Wis. Preferably, booms 28 have dual concave sections 35 that act as guideways for directing sludge 34 towards skimmers 36. Each section 35 has sides 37 which taper inwardly and are connected to opposite ends of skimmers 36.

Each skimmer 36 includes a rotating drum 38 having a smooth steel or plastic surface. Drums 38 preferably rotate with the flow of water so that they tend to push sludge 34 beneath the lagoon's surface as the sludge meets the moving surfaces of the drums, but this is not critical. Sludge 34 adheres to the drums' surfaces, and scrapers (not shown) in tangential contact with the drums' surfaces scrape the sludge therefrom and deposit the sludge in receptacles (not shown). This boom/skimmer apparatus is disclosed in greater detail in the copending application of J. F. Grutsch and G. C. Flood, assigned to Standard Oil of Indiana, filed herewith, and entitled "Water Purification System (II)" Ser. No. 824,781, now abandoned.

In accordance with the principal feature of our invention, lagoons 9–12 have floating on their surfaces apparatus 42 designed to control process conditions in each lagoon and inhibit sludge build-up on the bottom of each lagoon. As will be discussed later, apparatus 42 have the capability of providing different stirring rates, and they can be set such that upstream lagoons, such as lagoons 9 and 10, may be stirred more vigorously than downstream lagoons, such as lagoons 11 and 12. Eventually such controlled stirring leads to the evolution and concentration in downstream lagoons of organisms acclimatized to residual refractory compounds such as phenolics. Moreover, apparatus 42 aerate virtually all the lower stratas of lagoons 9–12. Consequently aerobic growth is promoted and anaerobic growth is suppressed.

As best illustrated in FIG. 3, each apparatus 42 includes a pair of rotary aerators 44 and 46 mounted between the two pairs of pontoons 48 and 50 connected together side by side by means of tie rods 60. Each apparatus 42 is moored at one end 52 by means of a V-shaped connecting bar 54 and swivel coupling 56 to posts 58 anchored in the bottoms of lagoons 9–12; and each aerator 44 and 46 includes power shaft 62 rotatably mounted in suitable bearings 64, drive means 66 which rotate shaft 62, and a plurality of flat blades 68 which bristle forth in a radial fashion from shaft 62. Suitable rotary aerators can be purchased from Beloit-Passavant Corporation of Janesville, Wis.

As shafts 62 rotate, blades 68 beat air into lagoon 10, churn the lagoon's surface, impart a vigorous velocity vector to the water, and propel apparatus 42. Since apparatus 42 is moored at end 52 to post 58, it pivots and moves along a circular course about the post. Apparatus 42 can move in either a clockwise or counterclockwise direction. Although we prefer to moor the apparatus as shown, this is not critical. Guide rails, cables, etc., can be used to control the path of apparatus 42. This is illustrated in FIG. 6. Moreover, at some large lagoons it may be more desirable to have an operator ride on apparatus equipped with a manual steering mechanism.

As best illustrated in FIG. 2, sludge build-up on bottom 44 of the lagoon is controlled by means of high velocity, churning water confined between baffle members 74 and 76 which extend toward the bottom 44. These baffle members 74 and 76, associated with each aerator 44 and 46, are connected between the pairs of pontoons 48 and 50 and reinforced by bars 77. Baffle members 74 are in front of aerators 44 and 46, and baffle members 76 are to the rear of these aerators. Thus, as apparatus 42 moves over lagoon 10, baffle members 74 lead the rotating blades 68, and baffle members 76 follow these blades. Baffle members 76 direct the churning surface water downwardly towards the bottoms of lagoons 9–12 to create a zone of high turbulence between baffle members 74 and 76, and this churning, turbulent water scours the sludge from the lagoon's bottom 44. Only one baffle member may be used, preferably, rear baffle 76. However, we use two baffle members, because this concentrates the churning turbulent water, and therefore improves scouring.

The upper portions (FIG. 4) of front baffle members 74 are expanded openings 80. The lower portions of baffle members 74 are solid elements 84. Expanded openings 80 make it easier for apparatus 42 to move, and elements 84 act in concert with baffle members 76 to confine the turbulence. Chains 86 or other rake mechanisms may be attached to elements 84. These chains 86 drag along the lagoons' bottoms to aid in scouring.

The upper portions of rear baffles 76 (FIG. 5) include movably mounted solid plates 90 which provide means for varying stirring rates. Lower portion 92 of baffles 76 are made of expanded metal. Holes 94 in the metal not only make it easier for apparatus 42 to move, but they also provide breeding sites for biological growth. There are gaps 96 between plates 90 and expanded metal portions 92, and the widths of these gaps 96 are governed by the position of plates 90. Churning water flows in a horizontal direction between gaps 96, and this propels apparatus 42. Churning water is also directed by plates 90 and baffles 76 downwardly in a vertical direction towards the bottoms of lagoons 9–12 to scour the lagoons' bottoms. The angles of plates 90 relative to the horizontally flowing water controls the amount of churning water directed towards bottom 44. By changing this angle, more or less water, as required, is used to vary stirring rates and to scour the lagoons' bottoms. In addition, the speed of each apparatus 42 can be varied by adjusting movable plates 90 to divert for propulsion more or less of the high velocity surface water.

FIG. 6 illustrates an alternate embodiment, apparatus 42', which is substantially the same as apparatus 42 except a novel steering mechanism 100 is used to guide apparatus 42' over the lagoon's surface. Apparatus 42' includes aerator 44' mounted between pontoons 48' and 50'. Baffle members 74' and 76' straddling aerator 44', extend below the lagoon's surface and direct churning surface water toward the lagoon's bottom. Preferably the upper portion of baffle 76' is equipped with a movable plate 90' to control stirring.

Steering mechanism 100 includes two tracks 102 and 104 located on opposite banks of the lagoon. Drive unit 106 equipped with winch 108 rides back and forth over track 102 as indicated by arrows b and b'. Power from line 110 is fed into unit 106 via control box 112 and lead line 114. Stops 116 and 118 at opposite ends of track 102 actuate switches (not shown) on unit 106. When a switch is actuated the direction of movement of unit 106 is reversed. Thus, when unit 106 while moving in the direction indicated by arrow b reaches stop 116, unit 106 reverses direction and moves in the direction indicated by arrow b'. When unit 106 reaches stop 118, it again reverses direction and once again moves in the direction indicated by arrow b. Winch 108 and cables 120 and 122, connected to aparatus 42', serve to move this apparatus back and forth across the lagoon's surface in the direction indicated by arrows c and c'. Cable 120 is wound about winch 108, and cable 122 is wound about idler pulley 128 which rides along track 104. Cable 120 has two stops 124 and 126 attached to it. These stops actuate switches (not shown) on unit 106 as winch 108 reels cable 120 in and out. When stop 124 strikes its switch, winch 108 reverses direction and apparatus 42', which is moving in the direction indicated by arrow c, reverses and moves in the direction indicated by arrow c'. When stop 126 strikes its switch, winch 108 once again reverses direction and the apparatus again moves in the direction indicated by arrow c. Because drive unit 106 is moving back and forth along track 102 at the same time that winch 108 is reversing direction, apparatus 42' traces a path back and forth along the course indicated as d.

Although the aerators shown in the preferred embodiments are of the floating rotary type, any aerators can be used in our system which are adapted to traverse the lagoons' surfaces and simultaneously introduce air into the surface water and churn this surface water. The only critical feature of our invention is that the aerator be equipped with means for direction some churning surface water towards the lagoons' bottoms.

We claim:

1. A method for purifying contaminated waste water containing refractory compounds, comprising the steps of:
  (a) passing the contaminated waste water through a series of lagoons in which thrive microorganisms that feed on the contaminants in the waste water and produce a sludge;
  (b) aerating substantially all the strata of the lagoons by introducing air into the lagoons' surface water, churning the surface water and directing at least some of the churning surface water toward the lagoons' ganisms is promoted and the growth of anaerobic bottoms, whereby the growth of aerobic microorganisms is suppressed;
  (c) stirring the water in the lagoons to prevent prolonged settling on the lagoons' bottoms of said sludge; and
  (d) creating in downstream lagoons an environment most favorable to the evolution and concentration of microorganisms that readily assimilate the refractory compounds by stirring downstream lagoons less vigorously than upstream lagoons, so that the retention time of microorganisms in the downstream lagoon is longer than the retention time of microorganisms in the upstream lagoons.

2. The method defined in claim 1 wherein the refractory compounds include phenolic compounds, the lagoons have a depth greater than 3 feet, aeration of the lower strata buoys up sludge which is removed from the lagoons' surfaces, and the purified effluent from the last downstream lagoon contains less than 0.05 p.p.m. phenolic compounds.

References Cited
UNITED STATES PATENTS

| | | | |
|---|---|---|---|
| 2,330,508 | 9/1943 | McColl | 210—242 |
| 2,948,677 | 8/1960 | Austin et al. | 210—15X |
| 3,154,601 | 10/1964 | Kalinske et al. | 210—150X |
| 3,208,734 | 9/1965 | Wood et al. | 261—91X |
| 3,320,160 | 5/1967 | Welles et al. | 210—15X |
| 3,322,410 | 5/1967 | Ahlenius | 210—242X |
| 3,234,123 | 2/1966 | Hinde | 210—15X |
| 3,335,081 | 8/1967 | El-Naggar | 210—150X |

MICHAEL ROGERS, Primary Examiner

U.S. Cl. X.R.

210—14, 201, 219, 242; 261—91, 120

PO-1050
(5/69)

UNITED STATES PATENT OFFICE
CERTIFICATE OF CORRECTION

Patent No. 3,589,997          Dated    June 29, 1971

Inventor(s)   James F. Grutsch and Russell C. Mallatt

It is certified that error appears in the above-identified patent and that said Letters Patent are hereby corrected as shown below:

Column 7, line 20 - where the word "aparatus" first appears in this line it should read --apparatus--.

Column 7, line 43 - "direction" should be --directing--.

Column 8, Claim 1 (b) should read as follows --aerating substantially all the stratas of the lagoons by introducing air into the lagoons' surface water, churning the surface water and directing at least some of the churning surface water toward the lagoons' bottoms, whereby the growth of aerobic microorganisms is promoted and the growth of anaerobic organisms is suppressed;--

Signed and sealed this 18th day of January 1972.

(SEAL)
Attest:

EDWARD M. FLETCHER, JR.          ROBERT GOTTSCHALK
Attesting Officer                Acting Commissioner of Patents